June 2, 1925.
H. A. MARTIN
DEVICE FOR CLEANING WALLS AND CEILINGS
Filed Sept. 24, 1924
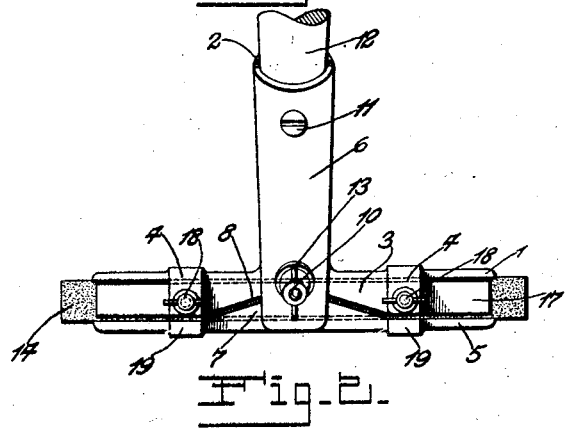
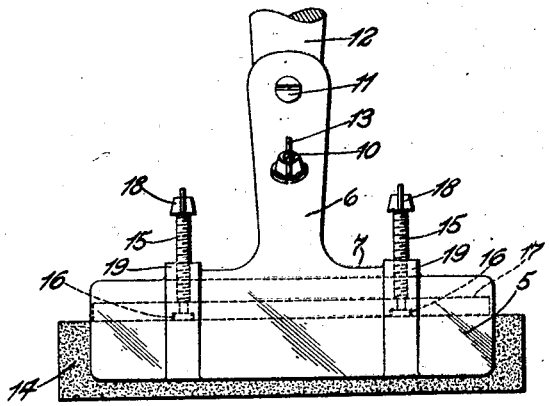
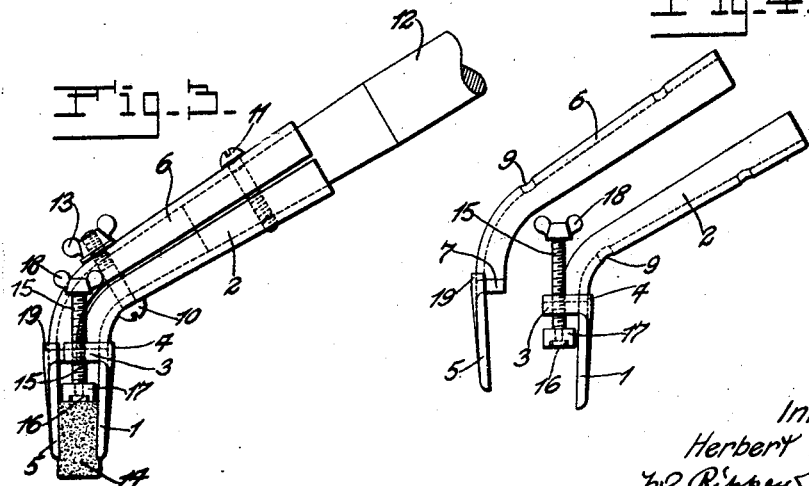
Inventor.
Herbert A. Martin,
by Rippey Kingsland.
His Attorneys.

Patented June 2, 1925.

1,539,857

UNITED STATES PATENT OFFICE.

HERBERT A. MARTIN, OF ST. LOUIS, MISSOURI.

DEVICE FOR CLEANING WALLS AND CEILINGS.

Application filed September 24, 1924. Serial No. 739,498.

*To all whom it may concern:*

Be it known that I, HERBERT A. MARTIN, a citizen of the United States, residing at St. Louis, Missouri, have invented a new and useful Device for Cleaning Walls and Ceilings, of which the following is a specification.

This invention is a device for cleaning walls and ceilings.

An object of the invention is to provide a device for holding material for cleaning walls, ceilings, etc., that may be economically manufactured and sold and which is capable of adjustment to hold pieces of cleaning material of different sizes and which is also provided with means for forcing the material to and holding the material in position in the device for proper use.

Other objects will appear from the following description, reference being made to the drawing in which—

Fig. 1 is a plan view of the invention.
Fig. 2 is a side elevation.
Fig. 3 is an end elevation.
Fig. 4 is a view showing the parts of the device in detached relationship.

In the embodiment of the invention shown the cleaning material holder is made in two parts, and said parts may be castings. One of said parts comprises a plate 1 having a tapered semi-tubular handle engaging part 2 integral therewith and extending obliquely therefrom. Said part also has a flange 3 integral with its upper edge and thickened portions 4 extending downwardly along the outer side of the plate 1 and across the flange 3. The handle engaging portion 2 is between the thickened portions 4.

The other part of the cleaning material holder is a casting comprising a plate 5 matching the plate 1 and having integral with the upper edge thereof a tapering semi-tubular handle engaging part 6 matching the handle engaging part 2. The integral union between the plate 5 and the handle engaging part 6 is strengthened by a flange 7 extending into a recess 8 in the flange 3.

The handle engaging parts 2 and 6 are provided with holes 9 through which a bolt 10 is passed for co-operation with a screw 11 which also passes through said handle engaging parts and through the end of the handle 12 to hold the parts of the device in rigid relationship. The bolt 10 is preferably provided with a wing nut 13 which is capable of manual operation to clamp or release the parts. The body 14 of cleaning material may be of any appropriate composition and is engaged between the plates 1 and 5, the clamping bolt 10 and screw 11 serving to clamp the plates upon the cleaning material.

Each of the thickened portions 4 has a threaded hole therethrough. A screw 15 extends through each of said threaded holes. The lower ends of the screws 15 have swivel connection 16 with a bar or plate 17 between the plates 1 and 5. The bar or plate 17 serves as a follower to force the cleaning material outwardly when said material becomes worn. The upper end of each of the screws 15 is provided with a handle portion 18 whereby said screws may be manually turned.

The flanges 3 and 7 serve to strengthen the plates 1 and 5. Near the ends of the flange 7 thickened portions 19 are formed which afford added strength and permit the plate 5 to be made relatively thin and light.

My invention is of simple and inexpensive character and may be easily removed and detached. The parts may be made of relatively light weight and at the same time of such strength that they will not break.

What I claim and desire to secure by Letters Patent is:—

1. A device of the character described comprising a plate, a flange integral with one edge of said plate, a material pressing device supported by said flange, an additional plate cooperating with said first plate to form a jaw, a projection extending from each of said plates, and a clamping device passing through said projections and holding said plates in proper relationship.

2. A device of the character described comprising a pair of castings, each of which includes a plate and an obliquely extending semi-tubular handle engaging portion; devices passing through said handle engaging portions for holding a handle in connection therewith and for holding said plates in rigid spaced relationship; and means supported between said plates for forcing cleaning material in a direction opposite from said handle engaging portions.

HERBERT A. MARTIN.